E. RING.
DRAFT RIGGING FOR CARRIERS.
APPLICATION FILED MAY 23, 1908.
899,435. Patented Sept. 22, 1908.
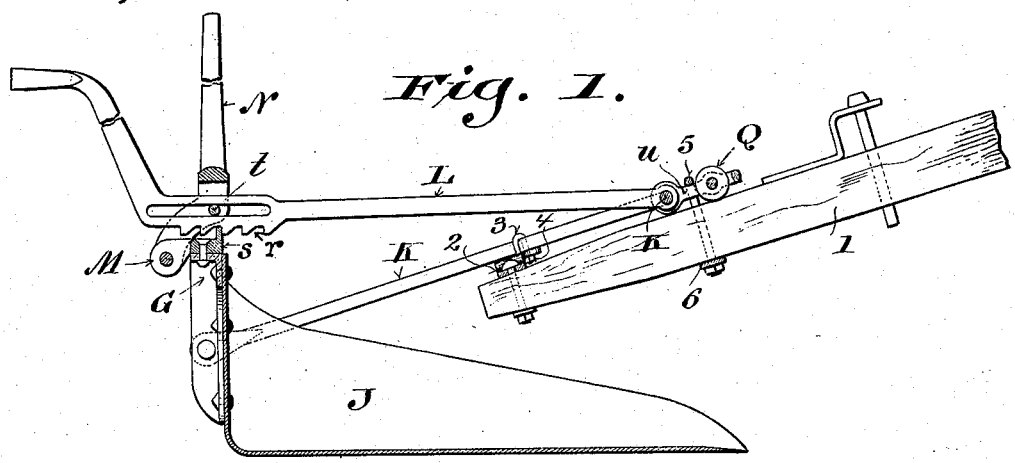
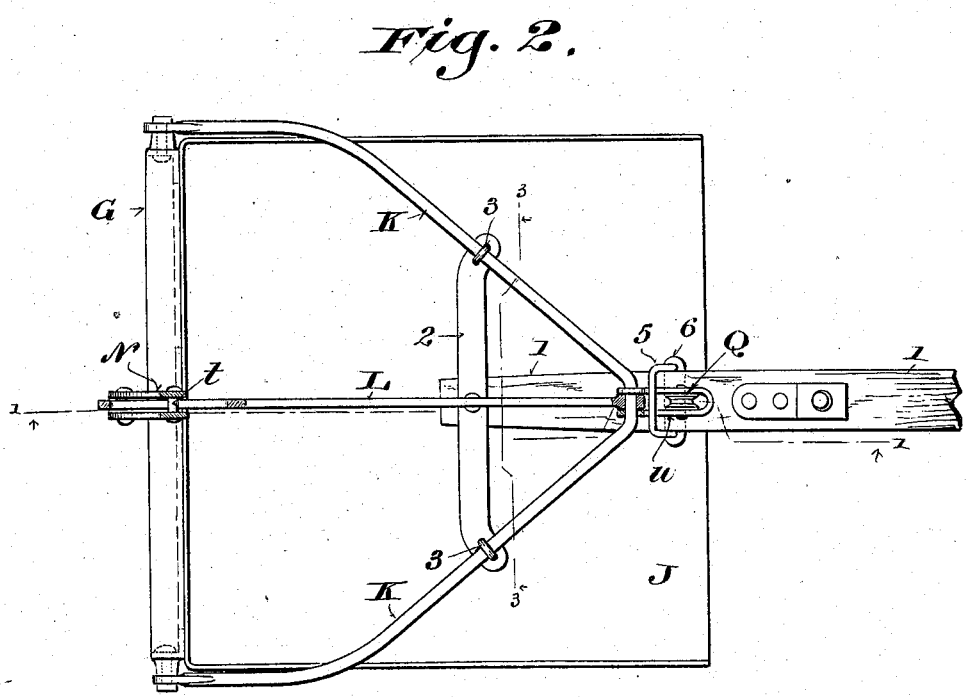
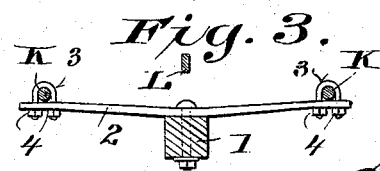
Witnesses:
George Felber
Frank W. Rogers
Inventor:
Edmund Ring
By Oliphant & Young
Attorneys

UNITED STATES PATENT OFFICE.

EDMUND RING, OF KINGSTON, WISCONSIN.

DRAFT-RIGGING FOR CARRIERS.

No. 899,435.  Specification of Letters Patent.  Patented Sept. 22, 1908.

Application filed May 23, 1908. Serial No. 434,474.

*To all whom it may concern:*

Be it known that I, EDMUND RING, a citizen of the United States, and resident of Kingston, in the county of Green Lake and State of Wisconsin, have invented certain new and useful Improvements in Draft-Rigging for Carriers; and I do hereby declare that the following is a full, clear, and exact description thereof.

The object of my invention is to provide a detachable draft-rigging for carriers, and is especially designed to be used in connection with carriers such as disclosed in my Letters-Patent No. 795,859 for improvements in manure loaders, granted August 1, 1905. In said patent a carrier, either in the form of a solid scraper shovel or tined is arranged to be operated in conjunction with a loading device, the carrier being connected to the loading device by a drag-rope to which rope power is applied for drawing the said carrier from a distance to the dumping-point. My present invention contemplates broadening the scope of this carrier by detaching the same from the drag-rope and as before stated connecting a draft-rigging thereto, whereby the carrier may be utilized for various kinds of work independent of the loader, being drawn by a horse or team.

The invention therefore consists in various details of construction and combination of parts as hereinafter fully set forth with reference to the accompanying drawings and subsequently claimed.

In the drawings: Figure 1 represents a longitudinal sectional elevation of a carrier having a draft-rigging in connection therewith embodying the features of my invention, the section being indicated by line 1—1 of Fig. 2; Fig. 2, a plan view of the same with parts broken away and in section to more clearly illustrate the details of construction, and Fig. 3, a detail cross-section of the draft-rigging, as indicated by line 3—3 of the preceding figure.

Referring by character to the drawings, G indicates a rear angle-bar to which is secured a scraper-shovel J, constituting a carrier. Connected to the ends of the rear angle-bar G is a triangular bail K, and connected to the apex of the bail is the forward end of a longitudinally slotted locking-lever L, having a rack-portion $r$ engageable with an upper flange $s$ of a bracket M fast to said bar. Engaging the slot in the locking lever L is a pin $t$ in connection with releasing lever N fulcrumed on the bracket, the lever being adapted to be either tripped by hand or engaged by a rod of a loading apparatus, not shown. A shaft-block Q is connected to the apex of the bail K by a suitable link $u$, and a similar shaft-block is attached to the loading apparatus (not shown) to which block one end of a drag-rope is fastened and rove through both blocks whereby the carrier when connected to the said loading apparatus is drawn.

The bail K is locked at any desired angle with relation to the shovel consistent with the work to be accomplished, whereby the draft upon said bail tends more or less to throw the cutting-edge of said shovel downward. This is accomplished by the engagement of the rack-portion $r$ of the lever L with the flange or stop $s$. When it is desired to dump the shovel of its contents, the lever N is rocked backward thus causing its pin $t$ to lift the rack $r$ clear of the stop. The above operation takes place while the shovel is in motion, and thereby causes the same to tilt forward or rock upon its cutting-edge assuming an inverted position as the bail lifts the rear end thereof.

All of the mechanism as described has been fully set forth in the patent to me mentioned, and in order to attach the device to a horse or team, the drag-rope is disconnected from the carrier, the bail of which is then dropped upon a draft-pole 1, which pole comprises a tongue for a team, although in some instances it may constitute a rear extension of a pair of shafts. The rear end of the pole is provided with a cross-bar 2 extending under the bail and having apertures therein for the reception of clip-bolts 3, which bolts straddle said bail and are secured by nuts 4 in threaded engagement with said bolts. The tongue is further connected to the bail by a clip-bolt 5 which straddles the shaft link and securely binds said bail at its apex, the clip-bolt 5 being retained by an apertured strap 6 which passes under the pole and receives threaded ends of said clip-bolt, which ends project therethrough and are engaged by suitable nuts. Owing to the angular shape of the bail the cross-bar 2 prevents endwise movement of the pole thereon, while the clip-bolt 5 locks the same against sidewise motion.

From the foregoing construction, it will be seen that the pole or shafts can readily be secured or detached from the carrier by inserting or removing the several nuts, thus requiring only a wrench to make the desired change in the carrier draft arrangement.

I claim:

In a carrier having a bail in pivotal connection therewith, a locking rack-lever in link-connection with the bail-apex, a catch on the carrier for engagement with the rack-lever, and a releasing lever for said rack-lever in connection with the carrier; the combination of a draft-rigging having a cross-bar, means for securing the cross-bar ends to the bail, and other means for securing the draft-rigging to the bail-apex.

In testimony that I claim the foregoing I have hereunto set my hand at Milwaukee, in the county of Milwaukee and State of Wisconsin in the presence of two witnesses.

EDMUND RING.

Witnesses:
GEORGE FELBER,
N. E. OLIPHANT.